United States Patent
Tsai

(10) Patent No.: US 6,296,082 B1
(45) Date of Patent: Oct. 2, 2001

(54) SCOOTER REAR WHEEL BRAKE

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 0 days.

(21) Appl. No.: 09/672,299

(22) Filed: Sep. 29, 2000

(51) Int. Cl.$^7$ .................................................. B62B 5/04
(52) U.S. Cl. ................ 188/19; 280/87.021; 280/87.041; 280/87.042
(58) Field of Search .................. 188/29, 19; 280/11.2, 280/87.021, 87.041, 87.042, 152.2, 160.1, 304.3

(56) References Cited

U.S. PATENT DOCUMENTS

| | | | |
|---|---|---|---|
| 3,288,251 | * | 11/1966 | Sakwa . |
| 4,003,582 | * | 1/1977 | Maurer .............................. 280/11.2 |
| 4,088,334 | * | 5/1978 | Johnson ............................ 280/11.2 |
| 4,394,029 | * | 7/1983 | Holmgren ........................ 280/11.23 |
| 4,799,701 | * | 1/1989 | Lindau ............................ 280/87.041 |
| 5,042,622 | * | 8/1991 | Smith .................................. 188/1.12 |
| 5,192,099 | * | 3/1993 | Riutta ................................. 280/11.2 |
| 5,320,367 | * | 6/1994 | Landis ................................. 280/11.2 |
| 5,383,536 | * | 1/1995 | Butter ................................. 188/1.12 |
| 5,927,733 | * | 7/1999 | Banda ............................ 280/87.041 |

* cited by examiner

Primary Examiner—Daniel G. DePumpo
Assistant Examiner—David A. Divine
(74) Attorney, Agent, or Firm—Browdy and Neimark

(57) ABSTRACT

A scooter rear wheel brake comprises a rear wheel cover which is mounted on the scooter footboard such that the rear wheel cover is located over the rear wheel of the scooter. The rear wheel cover is provided with a brake applying block and a brake shoe mount corresponding in location to the brake applying block. The brake shoe is linked with the brake applying block by which the brake shoe is actuated to act on the rear wheel in motion.

18 Claims, 4 Drawing Sheets

SCOOTER REAR WHEEL BRAKE

FIELD OF THE INVENTION

The present invention relates generally to a scooter, and more particularly to a rear wheel brake of the scooter.

BACKGROUND OF THE INVENTION

As shown in FIG. 1, a scooter rear brake of the prior art has a rear wheel cover which is mounted on the footboard such that the rear wheel cover is located over the rear wheel for bringing about a braking effect on the rear wheel by pressing the rear wheel cover against the rear wheel. The rear wheel cover is apt to swing aside to press against the rear wheel incorrectly, thereby undermining the braking effect. In addition, the contact area between the rear wheel cover and the rear wheel is not large enough to have a sufficient friction.

SUMMARY OF THE INVENTION

The primary objective of the present invention is to provide a scooter with a rear wheel brake free of the drawbacks of the prior art scooter rear wheel brake described above.

The present invention comprises a rear wheel cover which is mounted on a footboard of the scooter such that the rear wheel cover is located over the rear wheel of the scooter. The rear wheel cover is provided with a brake applying block, and a brake shoe mount corresponding in location to the brake applying block. The brake shoe is linked with the brake applying block by which the brake shoe is actuated to act on the rear wheel in motion.

The brake shoe is biased away from the rear wheel by an elastic member, e.g. a compression spring or a compression elastic piece.

DETAILED DESCRIPTION OF THE INVENTION

Figure 1:
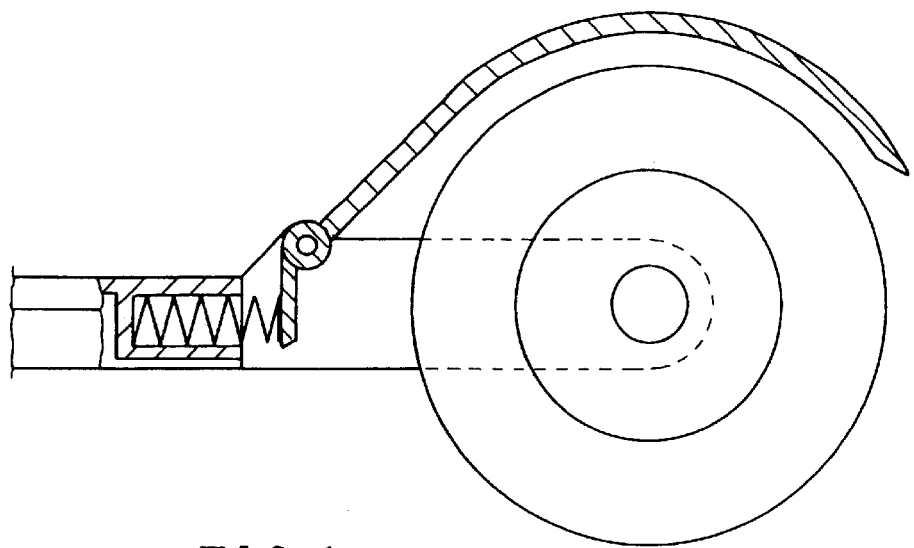
FIG. 1 shows a side schematic view of a prior art scooter rear wheel brake.
Figure 2:
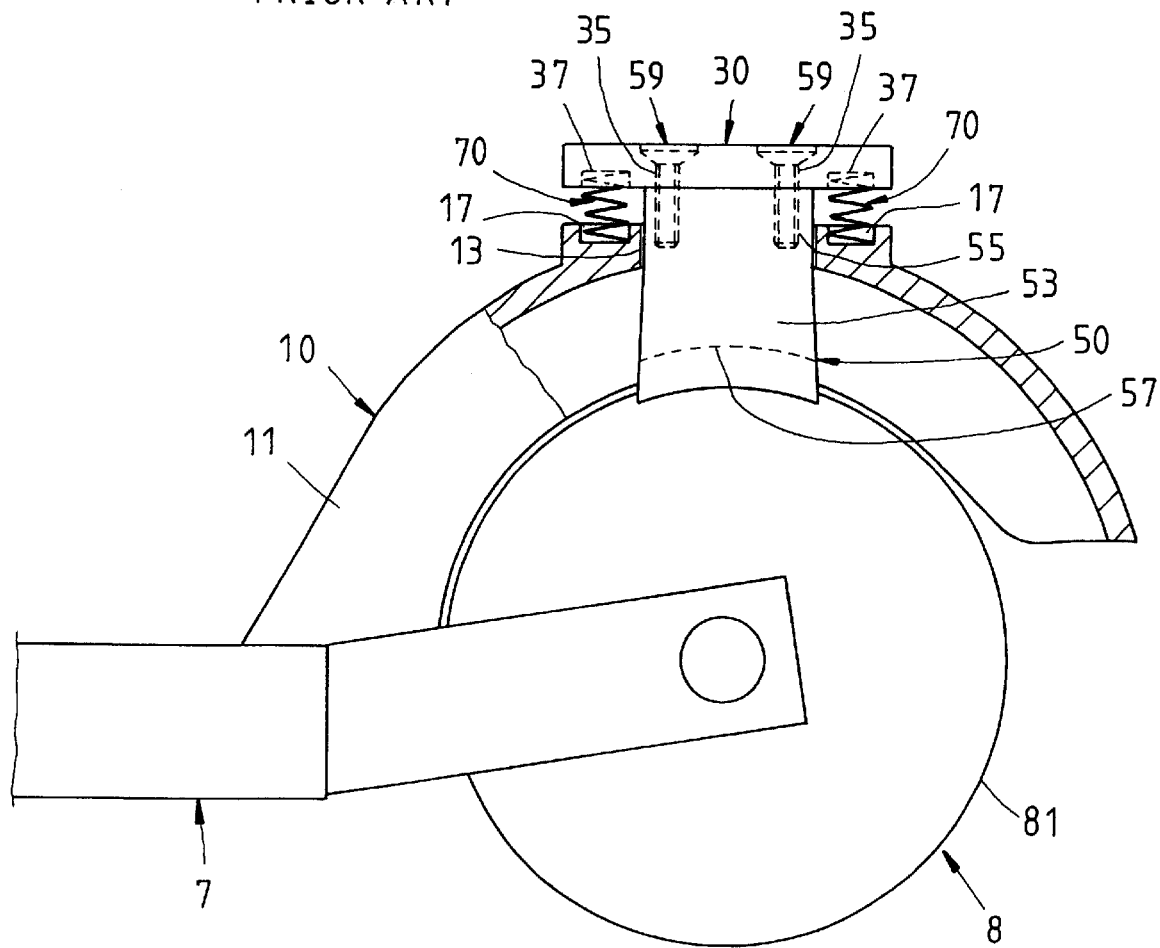
FIG. 2 shows a side schematic view of the present invention.

As shown in FIG. 2, the present invention is mounted on a scooter footboard 7 and is located over the rear wheel 8 having a rim 81 in contact with the ground surface.

Figure 3:
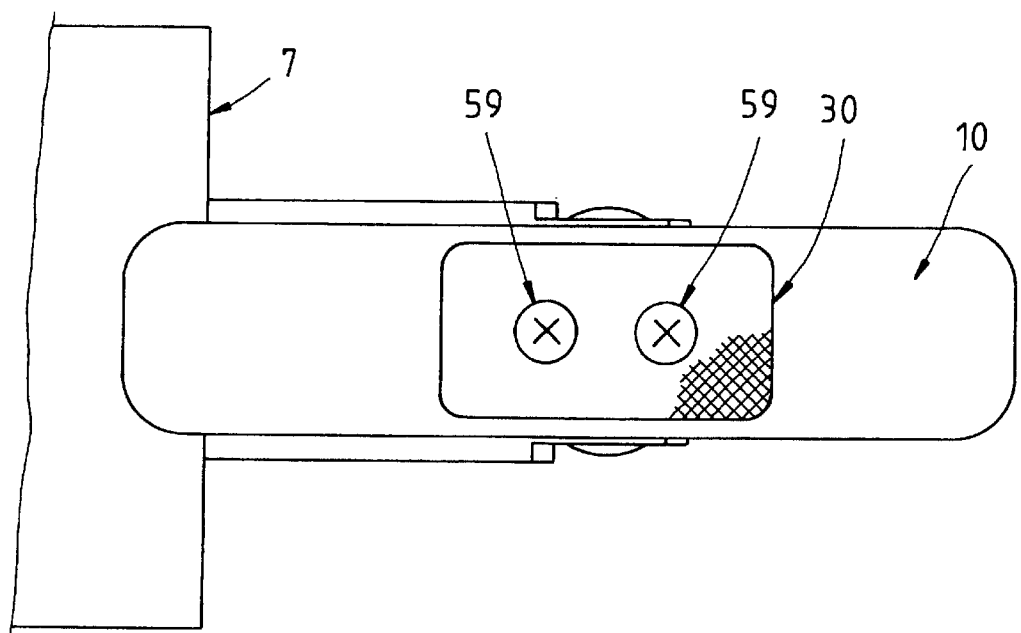
FIG. 3 shows a top view of the present invention.
Figure 4:
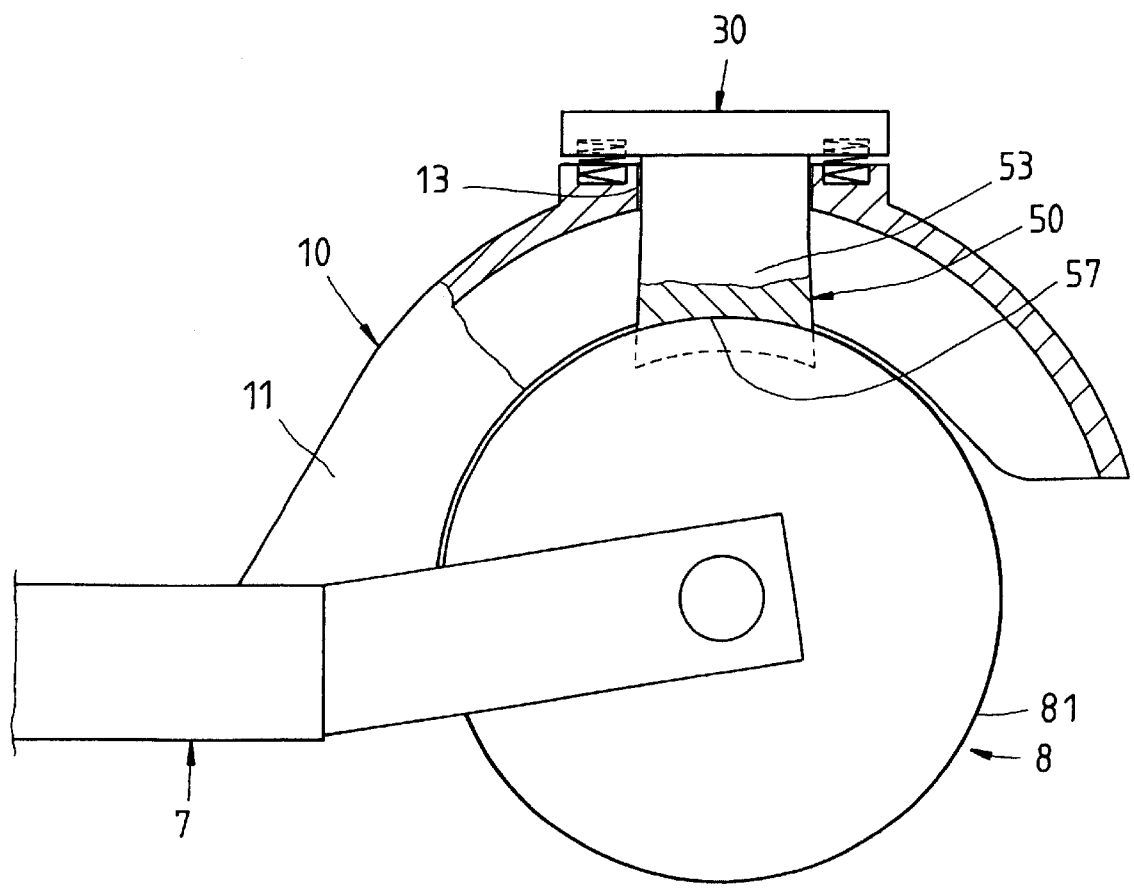
FIG. 4 shows a schematic view of the present invention in action.
Figure 5:
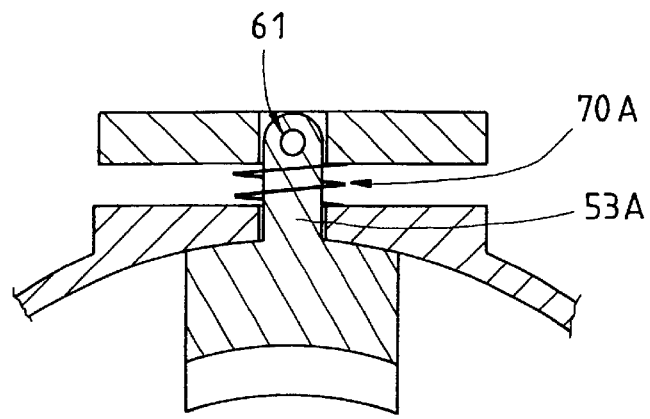
FIGS. 5–9 are side sectional views of the present invention.

As shown in FIGS. 3–5, the present invention comprises a wheel cover 10, a brake applying block 30, a brake shoe 50, and two springs 70.

The wheel cover 10 has a cover body 11 which is mounted on the footboard 7 and is provided with a movable hole 13 corresponding in location to the rim 81, and two receiving holes 17 located on two sides of the movable hole 13.

The brake applying block 30 is mounted on the wheel cover 10 and is provided with two fastening holes 35 and two receiving holes 37 corresponding in location to the receiving holes 17.

The brake shoe 50 has a connection portion 53, two threaded holes 55 corresponding in location to the fastening holes 35 for receiving a bolt 59. The brake shoe 50 has a braking surface 57 corresponding in profile to the wheel rim.

The two springs 70 are disposed in the receiving holes 17 of the wheel cover 10 such that the springs 70 urge the brake applying block 30, thereby keeping the brake shoe 50 apart from the wheel rim 81 by a predetermined distance, as shown in FIG. 2.

As shown in FIG. 4, when the brake applying block 30 is exerted on by an external force greater than the spring force of the springs 70, the braking surface 57 of the brake shoe 50 comes in contact with the rear wheel 8 in motion, thereby slowing or stopping the scooter.

As shown in FIG. 5, the connection portion 53A is pivoted with the brake applying block by a pivot 61 and is provided with a spring 70A fitted thereover to urge the brake applying block upward.

Figure 6:
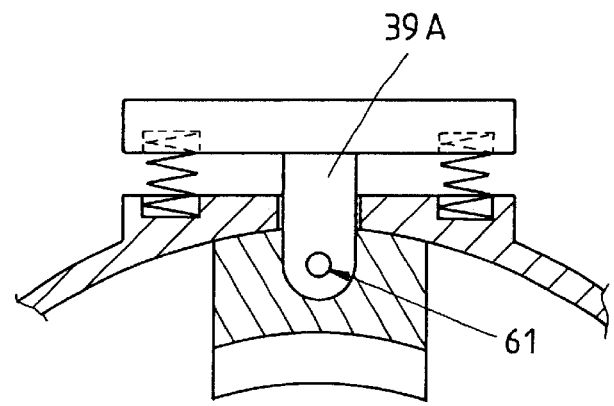

As shown in FIG. 6, the connection portion 39A is made integrally with the brake applying block and is pivoted at other end thereof with the brake shoe by a pivot 61.

Figure 7:
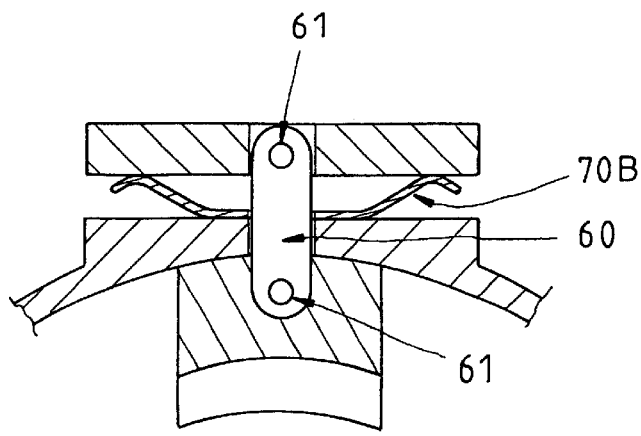

As shown in FIG. 7, the connection rod 60 are pivoted with the brake applying block and the brake shoe. The brake applying block is urged by a flat spring 70B.

Figure 8:
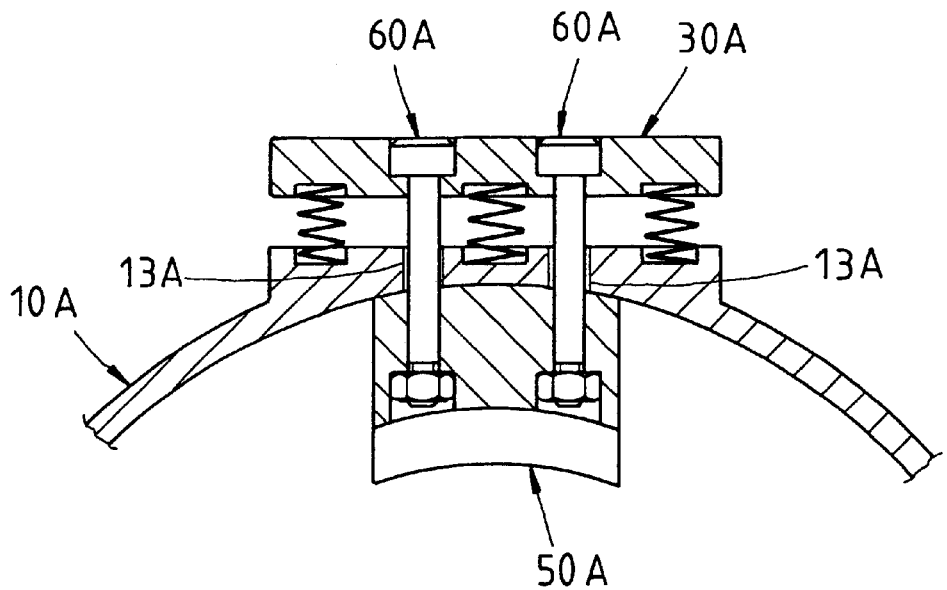

As shown in FIG. 8, the wheel cover 10A is provided with two movable holes 13A. The brake applying block 30A and the brake shoe 50A are fastened with the wheel cover 10A by two fastening bolts 60A which are received in the movable holes 13A.

Figure 9:
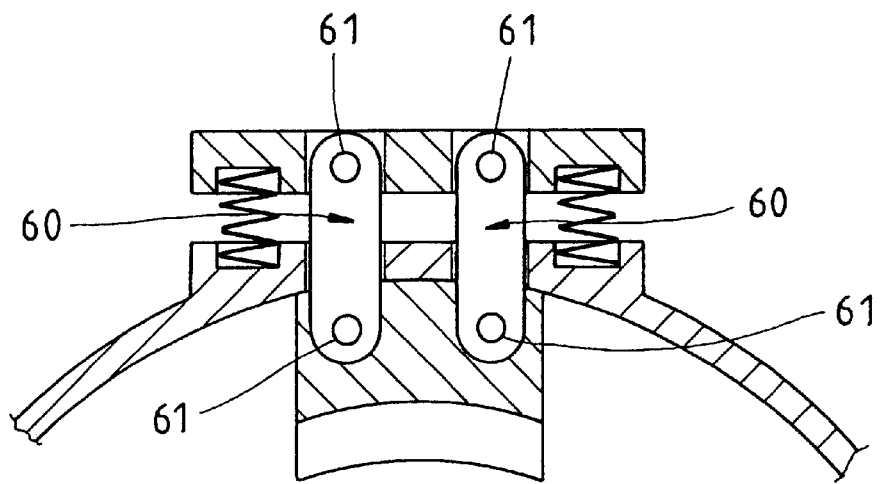

As shown in FIG. 9, two connection rods 60 are pivoted with the brake applying block and the brake shoe by a pivot 61, thereby forming an action mechanism, which can be coordinated with the wheel position, as illustrated in FIG. 10.

The present invention is effective in bringing about a braking action on the scooter rear wheel. In addition, the braking action of the present invention is brought about with precision and minimum wear to the wheel.

What is claimed is:

1. A scooter rear wheel brake comprising:

a wheel cover mounted on a scooter footboard and located over the scooter rear wheel, said wheel cover provided with a brake shoe mount comprising a hole through said wheel cover;

a brake applying block mounted on said wheel cover such that said brake applying block is corresponding in location to said brake shoe mount;

a brake shoe disposed in or below said brake shoe mount and linked with said brake applying block;

at least one connection member disposed in said brake shoe mount such that said connection member is linked with said brake applying block and said brake shoe;

said brake shoe being actuatable downwardly by said brake applying block to move generally vertically to come in contact with the scooter rear wheel in motion, so as to slow down or stop the scooter.

2. The scooter rear wheel brake as defined in claim 1, wherein said wheel cover is fixed on the scooter footboard.

3. The scooter rear wheel brake as defined in claim 1, wherein said wheel cover is movably fastened on the scooter footboard.

4. The scooter rear wheel brake as defined in claim 1, wherein said brake applying block is provided with a foot stepping surface.

5. The scooter rear wheel brake as defined in claim 1, wherein said brake applying block is urged by at least one elastic member.

6. The scooter rear wheel brake as defined in claim 5, wherein said elastic member is a compression spring.

7. The scooter rear wheel brake as defined in claim 5, wherein said elastic member is a compression elastic piece.

8. The scooter rear wheel brake as defined in claim 5, wherein said wheel cover is provided with at least one receiving hole to receive said elastic member.

9. The scooter rear wheel brake as defined in claim 1, wherein said connection member is integrally made with said brake applying block.

10. The scooter rear wheel brake as defined in claim 1, wherein said connection member is made integrally with said brake shoe.

11. The scooter rear wheel brake as defined in claim 9 wherein an end of said connection member opposite said block is fastened pivotally.

12. The scooter rear wheel brake as defined in claim 1, wherein said connection member is a bolt.

13. The scooter rear wheel brake as defined in claim 5, wherein said wheel cover is provided with two through holes for receiving two connection members.

14. The scooter rear wheel brake as defined in claim 13, wherein said connection members are pivoted with said brake applying block and said brake shoe.

15. The scooter rear wheel brake as defined in claim 10, wherein an end of said connection member opposite said brake shoe is fastened pivotally.

16. The scooter rear wheel brake of claim 1 wherein said brake shoe mount, said brake applying block and said at least one connection member are all disposed substantially vertically above the axis of the scooter rear wheel.

17. A scooter rear wheel brake comprising:
- a wheel cover mounted on a scooter footboard and located over the scooter rear wheel, said wheel cover provided with a brake shoe mount comprising a hole through said wheel cover;
- a brake applying block mounted on said wheel cover such that said brake applying block is corresponding in location to said brake shoe mount;
- a brake shoe disposed in or below said brake shoe mount and linked with said brake applying block;
- at least one connection member disposed in said brake shoe mount such that said connection member is linked with said brake applying block and said brake shoe;
- said brake shoe being actuatable by said brake applying block to come in contact with the scooter rear wheel in motion, so as to slow down or stop the scooter;
- wherein said connection member is elongated in a longitudinal direction, and said brake applying block and said brake shoe are connected adjacent opposite ends of said connection member and longitudinally aligned with said connection member.

18. A scooter rear wheel brake comprising:
- a wheel cover mounted on a scooter footboard and located over the scooter rear wheel, said wheel cover provided with a brake shoe mount comprising a hole through said wheel cover;
- a brake applying block mounted on said wheel cover such that said brake applying block is corresponding in location to said brake shoe mount;
- a brake shoe disposed in or below said brake shoe mount and linked with said brake applying block;
- at least one connection member disposed in said brake shoe mount such that said connection member is linked with said brake applying block and said brake shoe;
- said brake shoe being actuatable by said brake applying block to come in contact with the scooter rear wheel in motion, so as to slow down or stop the scooter;
- wherein said connection member is elongated and unitary, and said brake applying block is mounted adjacent an upper end of said connection member and said brake shoe is mounted adjacent an opposite end of said connection member.

\* \* \* \* \*